United States Patent

[11] 3,588,241

| [72] | Inventor | Cecil A. Broom<br>Forest Park, Ill. |
| --- | --- | --- |
| [21] | Appl. No. | 789,535 |
| [22] | Filed | Jan. 7, 1969 |
| [45] | Patented | June 28, 1971 |
| [73] | Assignee | Richard J. Powers<br>Elmhurst, Ill. |

[54] SPECIAL SYNCHRONIZER
11 Claims, 2 Drawing Figs.
[52] U.S. Cl. .................................................. 353/94
[51] Int. Cl. .............................................. G03b 21/26
[50] Field of Search........................................ 353/89, 91, 90, 98, 94; 352/92, 17, 133—135, 63, 68; 307/141, 141.4

[56] References Cited
UNITED STATES PATENTS
3,093,030  6/1963  Carrillo ........................ 353/94
3,282,155  11/1966  Cleary et al.................. 353/94
3,358,558  12/1967  Bradley........................ 353/90

*Primary Examiner*—Harry N. Haroian
*Attorney*—Hill, Sherman, Meroni, Gross and Simpson ABSTRACT: Apparatus for synchronizing a pair of slide projectors or other apparatus so that there is no delay such as occurs with a single slide projector between pictures. Both projectors are alternately loaded with opaque slides, and while one of the projectors is projecting an image on the screen, the other projector has an opaque slide in its lens system. When the advance button is depressed, the projector with the opaque slide is started into its advance cycle and as it nears the end of its cycle, the second projector, which has been showing the picture, is started into its advance cycle. These two operations are timed so that the picture from the second projector is removed from the screen at the same time as the picture from the first projector is projected onto the screen. The operation is repeated with alternate projectors projecting slides onto the screen.

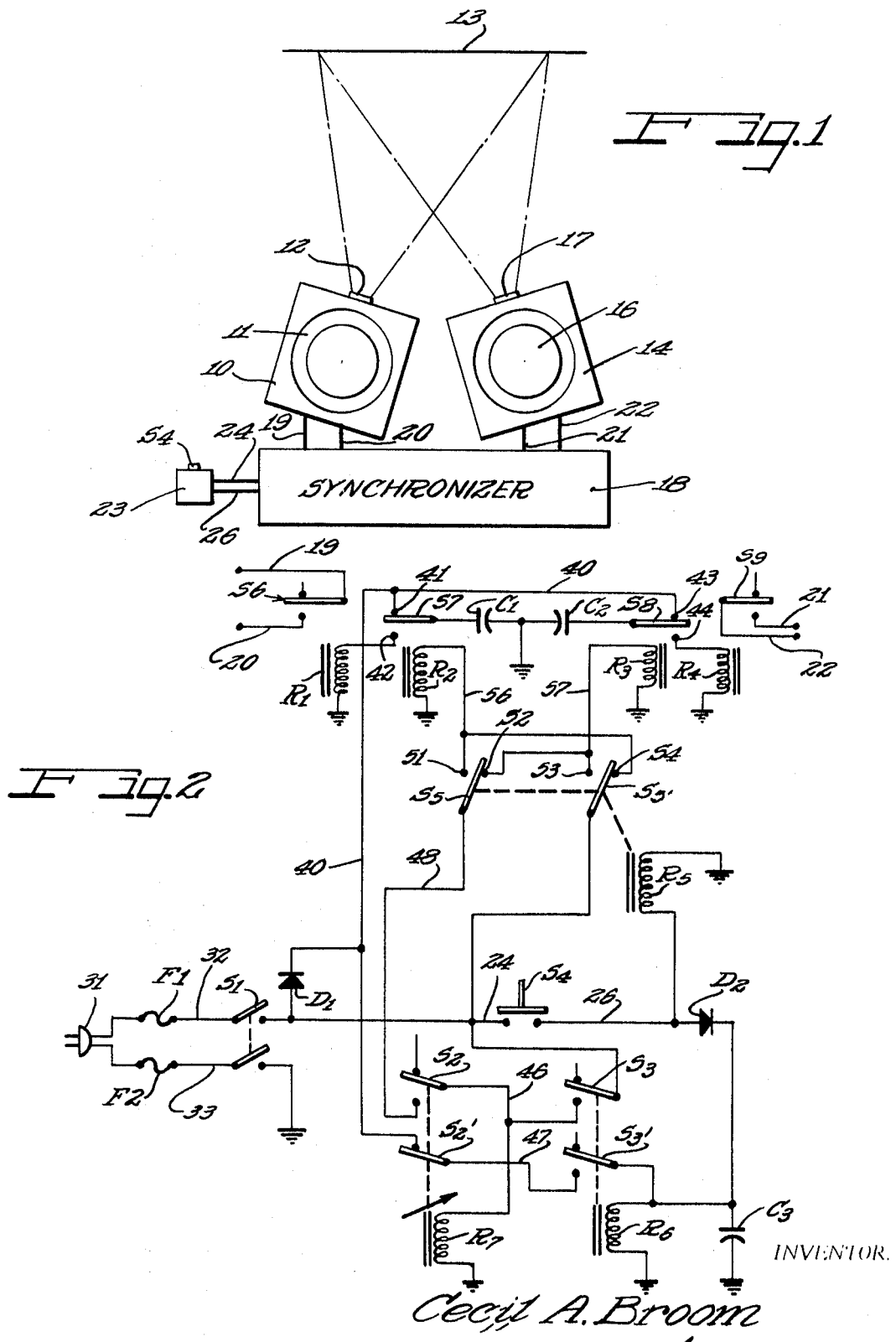

SPECIAL SYNCHRONIZER

BACKGROUND OF THE INVENTION

1. Field of the Invention

This invention relates in general to synchronizing mechanism and in particular to means for synchronizing a pair of slide projectors.

2. Description of the Prior Art

Automatic slide projectors for projecting slides onto a screen have been known. However, when the slides are changed, there is a transition period during which nothing is projected onto screen. In lectures and other presentations, it is desirable that pictures or slides be instantaneously changed so that there is no interval between slides when nothing is being projected.

SUMMARY OF THE INVENTION

The present invention utilizes a pair of slide projectors which are connected by a synchronizing circuit so that while one of the projectors is projecting a picture onto the screen the other projector has an opaque slide in its lens system. When an advance button is depressed the projector with the opaque slide starts its advance mechanism and as the projector with the opaque slide comes near to its advance stage a signal is produced for advancing the first slide projector. The result is that the delay time between the slides is adjustable and may either overlap the slides or leave a black screen for a very short time between slides, as desired. A modification of the invention allows shutters to be added to each projector and makes the use of opaque slides unnecessary.

Other objects, features and advantages of the present invention will be readily apparent from the following detailed description of certain preferred embodiments thereof when taken in conjunction with the accompanying drawings.

BRIEF DESCRIPTION OF THE DRAWINGS

FIG. 1 is a top view of a pair of projectors with the synchronizing mechanism of this invention connected; and FIG. 2 is a schematic view of the synchronizer of this invention.

DESCRIPTION OF THE PREFERRED EMBODIMENTS

FIG. 1 illustrates a screen 13 upon which a pair of projectors 10 and 14 project slides. The projector 10 has a slide magazine 11 and a lens 12, and slides may be advanced by connecting lead 19 to lead 20. The projector 14 has a slide magazine 16 and a lens 17 and may be advanced by connecting lead 21 to lead 22. The leads 19 and 20 and 21 and 22 are connected to a synchronizer 18, according to this invention. An advance button switch $S_4$ is mounted in a unit 23 that is connected by leads 24 and 26 to the synchronizer, as shown.

FIG. 2 is an electrical schematic of the advance and synchronizing mechanism of the invention. A power plug 31 has a pair of prongs which may be inserted into a suitable power outlet and supplies power through fuses $F_1$ and $F_2$ to power leads 32 and 33. An on-off switch $S_1$ has a first contact that connects lead 33 with ground when the switch is closed, and a second contact which connects the lead 32 to a diode $D_1$ and to lead 24. The other side of diode $D_1$ is connected to a lead 40 which is connected to switch contacts 41 and 43 of switches $S_7$ and $S_8$. The movable contact of switch $S_7$ is connected to one side of a condenser $C_1$ which has its other side connected to ground. The movable contact of switch $S_8$ is connected to the capacitor $C_2$ which has its other side connected to ground. The movable contact $S_7$ engages a contact 42 which is connected to a relay $R_1$ that has its other side connected to ground. The relay $R_1$ is mechanically connected to move the movable contact of switch $S_6$ which connects lead 19 to lead 20 when the relay $R_1$ is energized. The movable contact of switch $S_8$ engages the contact 44 which is connected to one side of relay $R_4$ that has its other side connected to ground. The relay $R_4$ is mechanically connected to switch $S_9$ which connects leads 21 and 22 when the relay $R_4$ is energized.

The switch $S_4$, when depressed, connects leads 24 and 26. Lead 26 is connected to a diode $D_2$ which has its other side connected to a capacitor $C_3$ that has its other side connected to ground. A relay $R_6$ has one side connected to ground and its other side connected to the diode $D_2$. The relay $R_6$ moves the movable contact of switches $S_3$ and $S_3'$. The movable contact $S_3$ is connected to lead 24 and when relay $R_6$ is energized the contact $S_3$ connects lead 24 to a lead 46. Switch $S_3'$ is connected to diode $D_2$ and when the relay $R_6$ is energized it makes contact with a contact 47. The lead 46 is connected to a time delay relay $R_7$ which has its other side connected to ground. The time delay relay $R_7$ moves switch contacts $S_2$ and $S_2'$. Switch $S_2'$ is connected to lead 46 and when the relay $R_7$ is energized, it connects lead 46 to a lead 48. The lead 47 is connected to the switch contact $S_2'$ which, when the relay $R_7$ is unenergized, is connected to the lead 40. The lead 48 is connected to the movable contact of a switch $S_5$. The relay $R_5$ is connected to the lead 26 and has its other side connected to ground. The relay $R_5$ moves the movable contacts $S_5$ and $S_5'$ between contacts 51 and 52 and 53 and 54, respectively. Contacts 51 and 54 are connected to a lead 56 which is connected to one side of a relay $R_2$ that has its other side connected to ground. Contacts 52 and 53 are connected to a lead 57 which is connected to one side of a relay $R_3$ that has its other side connected to ground.

In operation, the plug 31 is inserted into a power outlet and the switch $S_1$ is closed. When switch $S_1$ is closed, power will be supplied to the switch $S_5'$ to leads 56 and 57, depending upon the position of the ratchet switch $S_5$ and $S_5'$. In the position shown in FIG. 2, power would be supplied through lead 56 to relay $R_2$ to move the switch $S_7$ into engagement with the contact 42. Since the relay $R_3$ is not energized, the switch contact $S_8$ remains in engagement with contact 43. The projectors 10 and 14 would both be turned on and focused on the screen 13 and with the position of switches $S_5$ and $S_5'$, the projector 10 would be projecting a slide on the screen 13 and the projector 14 would be projecting no picture, since an opaque slide would be in its lens system. When it is desired to change the slides, the advance button $S_4$ is depressed connecting lead 24 with lead 26. This energizes the ratchet relay $R_5$ moving the switch contacts $S_5$ and $S_5'$ to engagement with contacts 51 and 53. The relay $R_3$ is energized by power from lead 32 through the switch contact $S_5'$. When relay $R_3$ is energized, switch contact $S_8$ will move from engagement with contact 43 to contact 44 and the electrical charge on condenser $C_2$ will discharge through the relay $R_4$ and energize it momentarily to cause the switch $S_9$ to move to electrically connect lead 21 with lead 22. This will cause the advance mechanism in the projector 14 to advance the projector one slide. At the same time, when switch $S_4$ is depressed, the relay $R_6$ will be energized through the diode $D_2$ moving switch contacts $S_3$ and $S_3'$ to engage leads 46 and 47, respectively, The switch contact $S_3$ will supply power to the time delay relay $R_7$ and it will be energized a predetermined time after the switch $S_3$ engages the lead 46, as for example, three-fourths of a second. Such time delay relays are available on the commercial open market. Before the relay $R_7$ is energized, the switch contact $S_2'$ will hold the relay $R_6$ energized through the switch contact $S_3'$. After the predetermined time delay, when the relay $R_7$ is energized, switch contact $S_2$ will move to connect lead 46 to lead 48 and switch contact $S_2'$ will move out of engagement with lead 40. Power will be supplied through the switch contact $S_3$ to lead 46 through switch contact $S_2$ to lead 48 through $S_5$ to contact 51 to momentarily energize relay $R_2$ thus moving switch contact $S_7$ to engage contact 42 and the condenser $C_1$ will discharge through relay $R_1$ thus closing switch $S_6$ and connecting lead 19 to lead 20. This will advance the projector 10.

This operation will be repeated for each of the projectors with the projector which is presenting a slide on the screen, keeping the slide on the screen until the other projector has been advanced. Just before the end of the cycle, the projector projecting the picture on the screen will be advanced.

The black time between the slides, or the overlap, is controlled by the time delay of the delay relay R₇. The area adjacent this relay shows that this may be adjusted, if desired, for different conditions.

It is also to be realized that rather than placing opaque slides in alternate positions in the magazines 11 and 16 of the projectors 10 and 14, that the projectors may be constructed with shutters which open upon alternate pulse signals to project the slides.

Although various minor modifications might be suggested by those versed in the art, it should be understood that I wish to embody within the scope of the Pat. warranted hereon all such modifications as reasonably and properly come within the scope of my contribution to the art.

I claim:

1. Means for advancing a pair of photo projectors at different times from a single control signal comprising:
   a. a pair of condensers connected together;
   b. a first pair of switches with their movable contacts connected to different ones of said pair of condensers;
   c. first stationary contacts of said first pair of switches connected together;
   d. a unilateral current means connected to said first stationary contacts;
   e. a power supply with one side connected to said unilateral current means;
   f. a first projector advance means connected to the second stationary contact of one of the first pair of switches;
   g. a second projector advance means connected to the second stationary contact of the second of said first pair of switches;
   h. a first pair of relays connected to the movable contacts of the first pair of switches;
   i. a second pair of switches with their first stationary contacts connected to one of said first pair of relays and their second stationary contacts connected to the second of said first pair of relays;
   j. a third relay connected to the movable contacts of said second pair of switches;
   k. said one side of the power supply connected to one of the movable contacts of said second pair of switches;
   l. an advance switch connected between said third relay and the one side of the power supply; and
   m. time delay means connected between the one side of the power supply and the second movable contact of the second pair of switches and controlled by the advance switch.

2. Means for advancing a pair of projectors according to claim 1 wherein said time delay means includes a time delay relay.

3. Means for advancing a pair of projectors according to claim 1 wherein said third relay comprises a ratchet relay.

4. Means for advancing a pair of projectors according to claim 1 wherein said time delay means includes, a fourth relay connected to said advance switch, a third pair of switches with their movable contacts controlled by the fourth relay and one of the movable contacts connected to the one side of the power supply and the other movable contact connected to the advance switch, a fifth time delay relay connected to a first stationary contact of one of the third pair of switches, a fourth pair of switches with the movable contact of one connected to the fifth relay, the movable contact of the other connected to a stationary contact of one of the fourth pair of switches, a stationary contact of one of said fourth pair of switches connected to the movable contact of one of the second pair of switches, and a stationary contact of the other of said fourth pair of switches connected to said unilateral current means.

5. Means for advancing a pair of projectors according to claim 4 comprising a second unilateral current means connected between said advance switch and the fourth relay.

6. Means for advancing a pair of projectors according to claim 5 comprising a third condenser connected to the fourth relay.

7. Means for advancing a pair of projectors according to claim 4 wherein said first and second projector advance means include sixth and seventh relays that control the advance switches of said projectors.

8. Means for advancing the slide advance mechanisms of a pair of photo projectors comprising:
   means for supplying a first advance signal to one of the slide mechanisms of one of said projectors; and
   time delay means energized by said advance signal and connected to supply a second advance signal to the other slide advance mechanism of said other projector after a predetermined time.

9. Means for advancing the slide advance mechanisms of a pair of projectors according to claim 8 comprising switching means connected to the means for supplying the first advance signal and the time delay means to alternately supply the first advance signal to the slide advance mechanisms of the first projector and supply the second advance signal to the slide advance mechanism of the other projector.

10. Means for advancing the slide advance mechanism of a pair of projectors according to claim 9 wherein said switching means comprises a ratchet relay.

11. Means for advancing the slide advance mechanism of a pair of projectors according to claim 10 where in said delay means includes a time delay relay.